(12) United States Patent
Zhang et al.

(10) Patent No.: US 12,032,122 B2
(45) Date of Patent: Jul. 9, 2024

(54) LONG-WAVE INFRARED ANTI-REFLECTION PROTECTIVE FILM ON ZnS SUBSTRATE AND PREPARATION METHOD THEREOF

(71) Applicants: Sinoma Synthetic Crystals Co., Ltd., Beijing (CN); Beijing Sinoma Synthetic Crystals Co., Ltd., Beijing (CN)

(72) Inventors: Xu Zhang, Beijing (CN); Xun Qian, Beijing (CN); Peng Zi, Beijing (CN); Shen Dang, Beijing (CN)

(73) Assignees: SINOMA SYNTHETIC CRYSTALS CO., LTD., Beijing (CN); BEIJING SINOMA SYNTHETIC CRYSTALS CO., LTD., Beijing (CN)

( * ) Notice: Subject to any disclaimer, the term of this patent is extended or adjusted under 35 U.S.C. 154(b) by 466 days.

(21) Appl. No.: 17/643,739

(22) Filed: Dec. 10, 2021

(65) Prior Publication Data

US 2022/0187504 A1 Jun. 16, 2022

(30) Foreign Application Priority Data

Dec. 11, 2020 (CN) .......................... 202011460832.3

(51) Int. Cl.
*G02B 1/115* (2015.01)
*G02B 5/20* (2006.01)

(52) U.S. Cl.
CPC .................................. *G02B 1/115* (2013.01)

(58) Field of Classification Search
CPC ........... G02B 1/115; G02B 1/113; G02B 1/11; G02B 5/22; G02B 5/208; G02B 1/14
See application file for complete search history.

(56) References Cited

U.S. PATENT DOCUMENTS 5,067,781 A * 11/1991 Montanari .............. C23C 14/08
427/166
2003/0077914 A1 4/2003 Le
2014/0198379 A1 7/2014 Akedo

FOREIGN PATENT DOCUMENTS

CN 1687807 A 10/2005
CN 108149210 A 6/2018
(Continued)

*Primary Examiner* — Ryan D Howard
(74) *Attorney, Agent, or Firm* — McDonnell Boehnen Hulbert & Berghoff LLP

(57) ABSTRACT

The present application provides a long-wave infrared anti-reflection protective film on a ZnS substrate and a preparation method thereof, wherein the ZnS substrate long-wave infrared anti-reflection protective film comprises a ZnS film layer and a $Y_2O_3$ film layer sequentially arranged on the ZnS substrate. The ZnS substrate has a thickness of 2-15 mm, and the ZnS film layer has a thickness of 80-120 nm, the $Y_2O_3$ film layer has a thickness of 1000-1300 nm, and a film structure of $Y_2O_3$ layer gradually changes from an inside to a surface. The method for preparing a long-wave infrared anti-reflection protective film on a ZnS substrate comprises the following steps: 1) performing a polishing treatment and surface treatment on the ZnS substrate; 2) depositing a ZnS film layer on the ZnS substrate; 3) depositing a $Y_2O_3$ film layer on the ZnS film.

11 Claims, 2 Drawing Sheets

(56) References Cited

FOREIGN PATENT DOCUMENTS

| | | |
|---|---|---|
| CN | 111007584 A | 4/2020 |
| CN | 111856628 A | 10/2020 |
| JP | 06067019 A | 3/1994 |
| JP | 08271701 A | 10/1996 |

* cited by examiner

LONG-WAVE INFRARED ANTI-REFLECTION PROTECTIVE FILM ON ZnS SUBSTRATE AND PREPARATION METHOD THEREOF

PRIORITY

The present application claims priority to Chinese patent application number 202011460832.3 filed Dec. 11, 2020, the entirety of which is hereby incorporated by reference herein.

TECHNICAL FIELD

The present application relates to the field of thin film technology, and particularly to a long-wave infrared anti-reflection protective film on a ZnS substrate and a preparation method thereof.

BACKGROUND

With the rapid development of modern advanced military optical systems, infrared is a key component of infrared technology. It must not only ensure the imaging quality of the optical system, but also protect the infrared sensor from external damage. In order to ensure the combat capability of the weapon system in harsh environments, its optical windows become more and more demanding for environmental adaptability, and high-performance film-coated infrared optical windows are indispensable for the windows and fairings in the guidance system.

Among infrared materials, ZnS is an important long-wave infrared material that is currently used. However, ZnS has poor mechanical properties and is hard to resist the erosion of sand, gravel and raindrops in the atmospheric environment during high-speed flight, and is even unable to resist impact damages caused by severe aerodynamic thermal/force action. In addition, due to a low transmittance of ZnS, an optical anti-reflection film must be plated when used as a window. Therefore, the quality of the film layer directly determines the performance of the guidance system, and is one of the indispensable key preparation technologies for modern precision-guided weapon systems.

Currently, ZnS substrate surface coatings are mostly made of soft materials such as ZnS, $YbF_3$, $LaF_3$ and the like. The film layer plating uses a multi-layer film system design, which has insufficient interlayer bonding force and weak film strength. It cannot withstand environmental tests such as sand dust, salt spray, damp heat, and temperature shock in the national military standard GJB 150-2009. Meanwhile, it is unable to meet the requirements for thermal shock resistance under high temperature conditions caused by aerodynamic heat during high-speed flight. The main film systems for the other anti-reflection protection include DLC films, carbides, oxides, phosphides, nitrides and the like. Among them, the transmittance of DLC, germanium carbide (GexC1-x) and boron phosphide (BP) can be designed to reach 90% and the hardness is relatively high. However, the film will inevitably occur severe performance degradation when flying at high speed and under harsh conditions. The degradation of the optical performance of the film and the very low transmittance will cause the infrared window to failure in high-speed flight.

Therefore, the development of a long-wave infrared anti-reflection protective film with a stable structure in high-speed flight has become an urgent problem to be solved by those skilled in the art.

SUMMARY

The object of the examples of the present application is to provide a long-wave infrared anti-reflection protective film on a ZnS substrate and a preparation method thereof, to solve the problem of the unstable structure of the long-wave infrared anti-reflection protective film during high-speed flight.

The first aspect of the present application provides a long-wave infrared anti-reflection protective film on a ZnS substrate, which comprises a ZnS film layer and a $Y_2O_3$ film layer sequentially arranged on the ZnS substrate;
  wherein the ZnS substrate has a thickness of 2-15 mm;
  wherein the ZnS film layer has a thickness of 80-120 nm, $Y_2O_3$ film layer has a thickness of 1000-1300 nm, and a film layer structure of the $Y_2O_3$ film layer gradually changes from an inside to a surface.

In some embodiments of the present application, a crystal structure of the $Y_2O_3$ film layer gradually changes from the inside to the surface.

In some embodiments of the present application, the $Y_2O_3$ film layer includes 8-14 sublayers, and the crystal structure of the $Y_2O_3$ film layer gradually changes from the sublayers near the ZnS film layer to the surface of the $Y_2O_3$ film layer.

In some embodiments of the present application, each of the sublayers has a thickness of 90-130 nm.

In some embodiments of the present application, the protective film has an average transmittance of 88% or more in the wavelength band of 7.0-9.5 µm.

The second aspect of the present application provides a method for preparing a long-wave infrared anti-reflection protective film on a ZnS substrate provided in the present application, comprising:
  1) performing a polishing treatment and a surface treatment on the ZnS substrate;
  2) depositing a ZnS film layer on the ZnS substrate;
  3) depositing a $Y_2O_3$ film layer on the ZnS film, and oxygen:argon ratio is (2.8-3.4):35 at the beginning of the depositing, the oxygen:argon ratio is gradually reduced during the depositing, and the oxygen:argon ratio is (0.6-1.0):35 at the end of the depositing;
  wherein the ZnS substrate has a thickness of 2-15 mm;
  each film layer has a thickness of:
  ZnS film layer: 80-120 nm, and $Y_2O_3$ film layer: 1000-1300 nm.

In some embodiments of the present application, wherein in step 3), the oxygen:argon ratio decreases linearly from the beginning of the depositing to the end of the depositing when the $Y_2O_3$ film layer is deposited on the ZnS film layer.

In some embodiments of the present application, wherein in step 3), the oxygen:argon ratio decreases stepwise at a rate of (0.1-0.3):35 for each additional sublayer when the $Y_2O_3$ film layer is deposited on the ZnS film layer;
  wherein each of the sublayers has a thickness of 90-130 nm.

In some embodiments of the present application, a current of electron beam evaporation deposition for the ZnS film layer is 15-25 mA, and a current of electron beam evaporation deposition for the $Y_2O_3$ film layer is 20-30 mA.

In some embodiments of the present application, an evaporation deposition rate for the ZnS film layer is 0.35-0.55 nm/s, and an evaporation deposition rate for the $Y_2O_3$ film layer is 0.3-0.5 nm/s.

In some embodiments of the present application, a deposition voltage for the ZnS film layer is 200-400 V, and a deposition voltage for the $Y_2O_3$ film layer is 8-10 kV.

The present application provides a long-wave infrared anti-reflection protective film on a ZnS substrate and a preparation method thereof. The long-wave infrared anti-reflection protective film on the ZnS substrate prepared by the method comprises a ZnS film layer and a $Y_2O_3$ film layer sequentially arranged on the ZnS substrate, wherein, the ZnS substrate has a thickness of 2-15 mm, the ZnS film layer has a thickness of 80-120 nm, and the $Y_2O_3$ film layer has a thickness of 1000-1300 nm. The film layer structure of the $Y_2O_3$ layer gradually changes from the inside to the surface. During the film layer depositing process, the structure of the film layer is controlled by adjusting the oxygen:argon ratio and the evaporation rate of the film in order to form a long-wave infrared anti-reflection protective film on the ZnS substrate with a good refractive index matching and stable structure. It has an average transmittance of 88% or more in the wavelength band of 7.0-9.5 μm, the hardness thereof is two to three times of the ZnS substrate, and each film layer has the advantages of good firmness, good friction resistance and high hardness, which meets the use requirements of infrared film layers for a high-speed aircraft.

Of course, the implementation of any product or method of the present application does not necessarily need to achieve all of the advantages described above at the same time.

BRIEF DESCRIPTION OF THE DRAWINGS

In order to explain the technical solutions of the examples of the present disclosure or the prior art more clearly, the drawings used in the description of the examples or the prior art will be briefly introduced as follows. It is obvious that the drawings in the following description are merely some embodiments of the present disclosure. For those skilled in the art, other embodiments can be obtained according to these drawings.

Reference number: 10. a ZnS substrate, 20. a ZnS film layer, 30. a $Y_2O_3$ film layer, 31. a first sublayer, 32. a second sublayer, 33. a third sublayer, 34. a fourth sublayer, 35. a fifth sublayer, 36. a sixth sublayer, 37. a seventh sublayer, 38. an eighth sublayer.

DETAILED DESCRIPTION

In order to make the objects, technical solutions, and advantages of the present application more precise, the present application will be described in detail below with reference to the accompanying drawings and examples. Obviously, the described examples are merely a part of the examples rather than all of the examples of the present disclosure. Based on the examples of the present disclosure, all other examples obtained will fall within the scope of the present disclosure.

The present application provides a long-wave infrared anti-reflection protective film on a ZnS substrate and a preparation method thereof, which are separately described in detail below:

In a first aspect, the present application provides a long-wave infrared anti-reflection protective film on a ZnS substrate, which comprises: a ZnS film layer and a $Y_2O_3$ film layer sequentially arranged on a ZnS substrate;
wherein the ZnS substrate has a thickness of 2-15 mm;
wherein the ZnS film layer has a thickness of 80-120 nm, the $Y_2O_3$ film layer has a thickness of 1000-1300 nm, and a film structure of the $Y_2O_3$ layer gradually changes from an inside to a surface.

In the present application, a content of a monoclinic phase and of a cubic phase in the $Y_2O_3$ layer described above gradually change from the inside to the surface.

For example, in some embodiments of the present application, the crystal structure in the $Y_2O_3$ film layer gradually changes from the inside to the surface, the content of the monoclinic phase gradually decreases from the inside to the surface, and the content of the cubic phase gradually increases from the inside to the surface.

Figure 1:
FIG. 1 is a schematic diagram of a cross-sectional structure in an embodiment of the present application.

FIG. 1 shows a schematic diagram of the cross-sectional structure in an embodiment of the present application. Referring to FIG. 1, a ZnS film layer 20 and a $Y_2O_3$ film layer 30 are sequentially arranged on a ZnS substrate 10 to form a long-wave infrared anti-reflection protective film on the ZnS substrate 10, in which, a content of a monoclinic phase gradually decreases and that of a cubic phase gradually increases from an inside to a surface in a film structure of the $Y_2O_3$ film layer 30.

In other embodiments of the present application, the $Y_2O_3$ film layer may comprise 8-14 sublayers. The present application does not specifically limit the number of the above-mentioned sublayers, as long as the object of the application can be achieved. For example, the $Y_2O_3$ film layer may comprise 9-13 sublayers. The crystal structure of the sublayer near the ZnS film layer in the $Y_2O_3$ film layer gradually changes to the crystal structure of the sublayer at surface of the $Y_2O_3$ film layer. The content of the monoclinic phase gradually decreases and that of the cubic phase gradually increases between the sublayers of the $Y_2O_3$ film layer.

Figure 2:
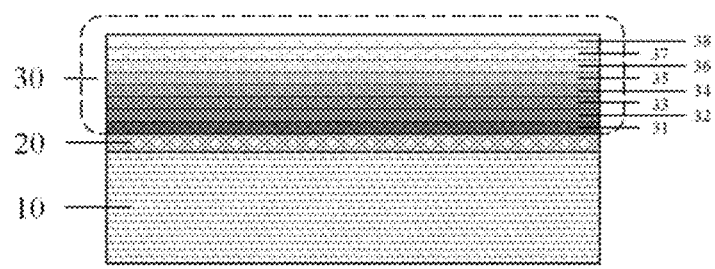
FIG. 2 is a schematic diagram of a cross-sectional structure in another embodiment of the present application.

FIG. 2 shows a schematic diagram of the cross-sectional structure in an embodiment of the present application. Referring to FIG. 2, the ZnS film layer 20 and the $Y_2O_3$ film layer 30 are sequentially arranged on the ZnS substrate 10 to form a long-wave infrared anti-reflection protective film on the ZnS substrate 10, in which, the $Y_2O_3$ film layer 30 comprises 8 sublayers: a first sublayer 31, a second sublayer 32, a third sublayer 33, a fourth sublayer 34, a fifth sublayer 35, a sixth sublayer 36, a seven sublayer 37 and an eighth sublayer 38. Content of the monoclinic phase in the $Y_2O_3$ film layer 30 decreases stepwise from the first sublayer 31 to the eighth sublayer 38, and that of the cubic phase in the $Y_2O_3$ film layer 30 decreases stepwise from the first sublayer 31 to the eighth sublayer 38.

In the present application, the thickness of the above-mentioned sub-layer is not particularly limited, as long as the object of the present application can be achieved. For example, each of the sublayers has a thickness of 90-130 nm. It should be noted that the thickness of different sublayers in the application can be the same or different, and those skilled in the art can select according to actual needs, as long as the object of the present application can be achieved.

In some embodiments of the present application, the protective film has an average transmittance of 88% or more in the wavelength band of 7.0-9.5 μm. It can be seen that the average transmittance of the long-wave infrared anti-reflection protective film on the ZnS substrate provided by the present application is relatively high.

The long-wave infrared anti-reflection protective film on the ZnS substrate provided by the present application comprises the ZnS film layer and the $Y_2O_3$ film layer sequentially arranged on the ZnS substrate, in which, the ZnS substrate has a thickness of 2-15 mm, the ZnS film layer has a thickness of 80-120 nm, and the $Y_2O_3$ film layer has a thickness of 1000-1300 nm, and the film structure of the $Y_2O_3$ layer gradually changes from the inside to the surface. The long-wave infrared anti-reflection protective film on the ZnS substrate has a good refractive index matching and a stable structure.

In the second aspect, the present application provides a method for preparing long-wave infrared anti-reflection protective film on the ZnS substrate provided by the application, comprising:

1) performing a polishing treatment and surface treatment on the ZnS substrate;
2) depositing a ZnS film layer on the ZnS substrate;
3) depositing a $Y_2O_3$ film layer on the ZnS film, and oxygen:argon ratio is (2.8-3.4):35 at the beginning of the deposition, the oxygen:argon ratio is gradually reduced during the deposition process, and the oxygen:argon ratio is (0.6-1.0):35 at the end of the deposition;
wherein the ZnS substrate has a thickness of 2-15 mm;
wherein ZnS film layer has a thickness of 80-120 nm, and the $Y_2O_3$ film layer has a thickness of 1000-1300 nm.

In the present application, the method for polishing the ZnS substrate is not particularly limited, and those skilled in the art can choose according to actual needs, as long as the object of the present application can be achieved, for example, mechanical polishing. After polishing the ZnS substrate, its surface finish can reach Grade IV or Grade V.

In the present application, the method for surface treatment of the ZnS substrate is not particularly limited. Those skilled in the art can choose according to actual needs, as long as the object of the present application can be achieved. For example, at least one of acetone, absolute ethanol or purified water is used to clean in ultrasonic, and the surface is wiped with nano-diamond powder and the like.

In the present application, the method for depositing the ZnS film layer and the $Y_2O_3$ film layer is not particularly limited, as long as the object of the present application can be achieved. For example, an evaporation coating method or a sputtering coating method can be used.

The "oxygen to argon ratio" in the present application refers to a ratio of the amount of oxygen supplied to the amount of argon supplied. The structure of the film layer can be controlled by adjusting the oxygen:argon ratio to form the long-wave infrared anti-reflection protective film on the ZnS substrate with a good refractive index matching and a stable structure.

In the above-mentioned step 3) of the present application, the oxygen:argon ratio at the beginning of the deposition is (2.8-3.4):35 when the $Y_2O_3$ film is deposited on the ZnS film, the oxygen:argon ratio is gradually reduced during the deposition process, and the oxygen:argon ratio at the end of the deposition is (0.6-1.0):35, in which, the method for reducing the oxygen:argon ratio during the deposition process is not particularly limited, as long as the object of the present application can be achieved.

For example, in some embodiments of the present application, the above-mentioned oxygen:argon ratio decreases linearly from the beginning of the deposition to the end of the deposition. A $Y_2O_3$ film layer with a gradual change in crystal structure from the inside to the surface can be obtained by linearly decreasing the oxygen:argon ratio.

In another embodiment of the present application, the above-mentioned oxygen to argon ratio decreases stepwise (0.1-0.3):35 for each additional sublayer, in which, the thickness of the sublayers is the same or different and may be 90-130 nm. It should be noted that the oxygen to argon ratio decreases stepwise (0.1-0.3):35 for each additional sublayer, and the decrease can be the same or different. A $Y_2O_3$ film layer with a stepwise change in crystal structure from the sublayer near the ZnS film layer to the surface of the $Y_2O_3$ film layer is obtained through the stepwise reduction of the oxygen to argon ratio.

In some embodiments of the present application, there are no particular restrictions on a current of electron beam evaporation deposition the ZnS film layer and the $Y_2O_3$ film layer, as long as the object of the present application can be achieved. For example, the current of electron beam evaporation deposition of the ZnS film layer is 15-25 mA, and the current of electron beam evaporation deposition of the $Y_2O_3$ film layer is 20-30 mA.

In some embodiments of the present application, an evaporation deposition rate of the ZnS film layer is 0.35-0.55 nm/s, and an evaporation deposition rate of the $Y_2O_3$ film layer is 0.3-0.5 nm/s. A high-quality long-wave infrared anti-reflection protective film on the ZnS substrate with good structural stability can be obtained by controlling the evaporation deposition rate of the ZnS film layer and the $Y_2O_3$ film layer within the above-mentioned range.

In some embodiments of the present application, a deposition voltage of the ZnS film layer and the $Y_2O_3$ film layer is not particularly limited, as long as the object of the present application can be achieved. For example, the deposition voltage of the ZnS film layer is 200-400 V, and the deposition voltage of the $Y_2O_3$ film layer is 8-10 kV.

In the above-mentioned method for preparing the long-wave infrared anti-reflection protective film on the ZnS substrate provided by the present application, during the coating process of each film layer, the structure of the long-wave infrared anti-reflection protective film on the ZnS substrate of the present application is controlled and its refractive index matching and structural stability are improved by adjusting the oxygen:argon ratio and the evaporation rate of the coating material. The present preparation method increases the density of the film layer by controlling its thickness, making it excellent in optical performance. The long-wave infrared anti-reflection protective film on the ZnS substrate has an average transmittance of 88% or more in the wavelength band of 7.0-9.5 μm, and its hardness is two to three times or more of the substrate hardness, and each layer has the advantages of good firmness, good friction resistance and high hardness, which meets the use requirements of infrared film layers for a high-speed aircraft.

EXAMPLES

Hereinafter, the examples and comparative examples are provided to describe the embodiments of the present application more specifically.
Test Method
High and Low Temperature Test:
  Keeping the temperature at −50° C. and 100° C. for 4 h separately, with the humidity of 95% at 100° C. for 5 times.
Damp Heat Test:
  Under the conditions of temperature of 60° C. and relative humidity of 95%, lasting 8 h; and under the conditions of temperature of 30° C. and relative humidity of 95%, lasting 8 h; alternating for 5 cycles.
Adhesion Test:
  The 3M tape was firmly attached to the surface of the film layer and was pulled up vertically and quickly.
Repeated Friction Test:
  Rubbing by a rubber friction head with a pressure of 9.8N for 40 times (20 turns).
High Temperature Test:
  The muffle furnace was heated to 400° C., in which the sample was placed for 0.5 h.
Test Method for Average Transmittance:
  NEXUS670 Fourier infrared spectrometer was used to test the transmittance.

Example 1

<Preparation of the Long-Wave Infrared Anti-Reflection Protective Film on the ZnS Substrate>

1) A ZnS substrate with a thickness of 8 mm was performed by a mechanical polishing treatment to have a surface finish level IV, and then the ZnS substrate was cleaned in ultrasonic for 10 min by using acetone, absolute ethanol and purified water. The ZnS substrate was taken out and then wiped, dried in an oven at 100° C. for 10 min. The dried ZnS substrate was wiped with nano-diamond powder for 2 min, and then was wiped to clean by using absorbent cotton dipping in absolute ethanol;
2) A ZnS film layer with a thickness of 100 nm obtained in step 1) by the evaporation coating method was deposited on the ZnS substrate, a current of electron beam evaporation deposition during the deposition process was 20 mA, an evaporation deposition rate was 0.45 nm/s, and a deposition voltage was 400 V;
3) A $Y_2O_3$ film layer with a thickness of 1200 nm obtained in step 2) by the evaporation coating method was deposited on the ZnS film layer, wherein oxygen:argon ratio at the beginning of the deposition was 3.4:35, the oxygen:argon ratio was linearly reduced during the deposition process, and the oxygen:argon ratio was 0.8:35 at the end of the deposition. A current of electron beam evaporation deposition during the deposition process was 25 mA, an evaporation deposition rate was 0.4 nm/s, and a deposition voltage was 10 kV;
4) The long-wave infrared anti-reflection protective film on the ZnS substrate was obtained when the temperature of the deposition chamber was decreased to room temperature.

<Experimental Test>

Figure 3:
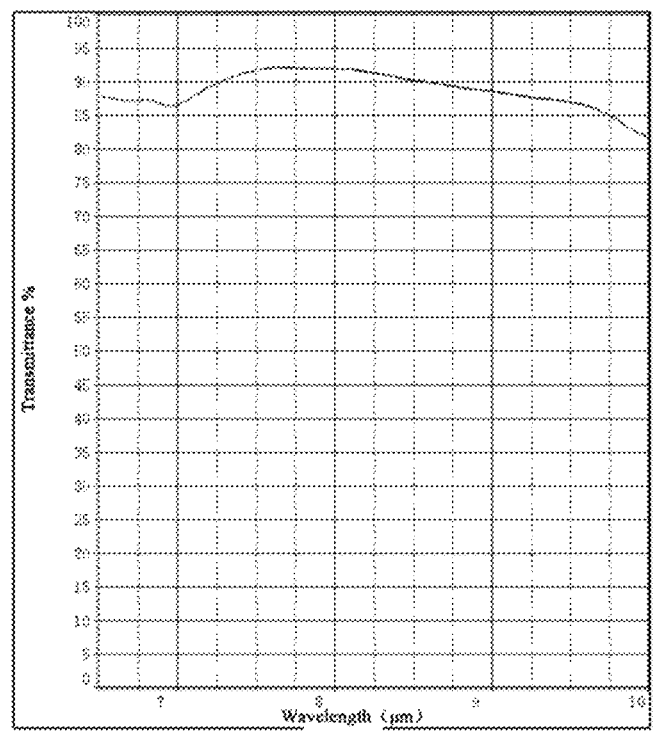
FIG. 3 is the transmittance curve of Example 1 of the present application in long-wave infrared wave band at room temperature.
Figure 4:
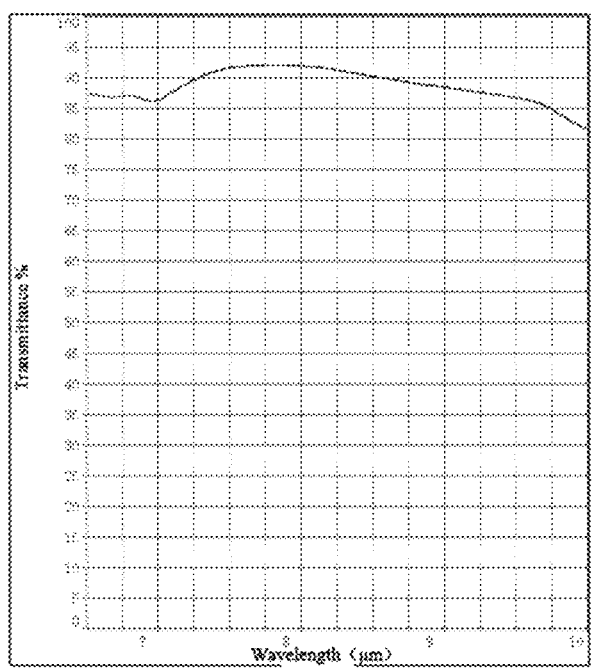
FIG. 4 is the transmittance curve of Example 1 of the present application in long-wave infrared wave band at 400° C.

The prepared long-wave infrared anti-reflection protective film on the ZnS substrate described above was subjected to high and low temperature test, damp heat test, adhesion test, repeated friction test, and high temperature test. The test results showed that the film layer was intact, without cracking and peeling off, and the like;

The prepared long-wave infrared anti-reflection protective film on the ZnS substrate described above was carried out with the transmittance test at room temperature and 400° C., respectively, and an average transmittance in the wavelength band of 7.0-9.5 μm was obtained. FIG. 3 showed the transmittance curve of the long-wave infrared anti-reflection protective film on the ZnS substrate of Example 1 in the long-wave infrared band at room temperature. FIG. 4 showed the transmittance curve of Example 1 in the long-wave infrared band at 400° C.

Example 2

<Preparation of the Long-Wave Infrared Anti-Reflection Protective Film on the ZnS Substrate>

Steps 1) to 2) were the same as in Example 1;

3) A $Y_2O_3$ film layer with a thickness of 1000 nm obtained in step 2) by the evaporation coating method was deposited on the ZnS film layer, wherein oxygen:argon ratio at the beginning of the deposition was 2.8:35, the oxygen:argon ratio was linearly reduced during the deposition process, and the oxygen:argon ratio was 0.6:35 at the end of the deposition. A current of electron beam evaporation deposition during the deposition process was 20 mA, an evaporation deposition rate was 0.3 nm/s, and a deposition voltage was 5 kV;
4) The long-wave infrared anti-reflection protective film on the ZnS substrate was obtained when the temperature of the deposition chamber is decreased to room temperature.

<Experimental Test>

The prepared long-wave infrared anti-reflection protective film on the ZnS substrate described above was subjected to high and low temperature test, damp heat test, adhesion test, repeated friction test, and high temperature test. The test results showed that the film layer was intact, without cracking and peeling off, and the like;

The prepared long-wave infrared anti-reflection protective film on the ZnS substrate described above was carried out with the transmittance test at room temperature and 400° C., respectively, and an average transmittance in the wavelength band of 7.0-9.5 μm was obtained.

Example 3

<Preparation of the Long-Wave Infrared Anti-Reflection Protective Film on the ZnS Substrate>

Steps 1) to 2) were the same as in Example 1;

3) A $Y_2O_3$ film layer with a thickness of 1300 nm obtained in step 2) by the evaporation coating method was deposited on the ZnS film layer, wherein oxygen:argon ratio at the beginning of the deposition was 3.1:35, the oxygen:argon ratio was linearly reduced during the deposition process, and the oxygen:argon ratio was 1.0:35 at the end of the deposition. A current of electron beam evaporation deposition during the deposition process was 30 mA, an evaporation deposition rate was 0.5 nm/s, and a deposition voltage was 10 kV;
4) The long-wave infrared anti-reflection protective film on the ZnS substrate was obtained when the temperature of the deposition chamber is decreased to room temperature.

<Experimental Test>

The prepared long-wave infrared anti-reflection protective film on the ZnS substrate described above was subjected to high and low temperature test, damp heat test, adhesion test, repeated friction test, and high temperature test. The test results showed that the film layer was intact, without cracking and peeling off, and the like;

The prepared long-wave infrared anti-reflection protective film on the ZnS substrate described above was carried out with the transmittance test at room temperature and 400° C., respectively, and an average transmittance in the wavelength band of 7.0-9.5 μm was obtained.

Example 4

<Preparation of the Long-Wave Infrared Anti-Reflection Protective Film on the ZnS Substrate>

Steps 1) to 2) were the same as in Example 1;

3) 13 sublayers with a thickness of 100 nm obtained in step 2) by evaporation coating method were deposited on the ZnS film layer to form a $Y_2O_3$ film layer; wherein:

Oxygen:argon ratio of a deposited first sublayer was 3.4:35, that of a deposited second sublayer was 3.2:35, that of a deposited third sublayer was 3.0:35, that of a deposited fourth sublayer was 2.8:35, that of a deposited fifth sublayer was 2.6:35, that of a deposited sixth sublayer was 2.4:35, that of a deposited seventh sublayer was 2.2:35, that of a deposited eighth sublayer was 2.0:35, that of a deposited ninth sublayer was 1.8:35, that of a deposited 10th sublayer was 1.6:35, that of a deposited 11th sublayer was 1.4:35, that of a deposited 12th sublayer was 1.2:35, that of a deposited 13th sublayer was 1.0:35;

During the deposition process, a current of electron beam evaporation deposition was 25 mA, a deposition evaporation rate was 0.4 nm/s, and a deposition voltage was 10 kV;

4) The long-wave infrared anti-reflection protective film on the ZnS substrate was obtained when the temperature of the deposition chamber is decreased to room temperature.

<Experimental Test>

The prepared long-wave infrared anti-reflection protective film on the ZnS substrate described above was subjected to high and low temperature test, damp heat test, adhesion test, repeated friction test, and high temperature test. The test results showed that the film layer was intact, without cracking and peeling off, and the like;

The prepared long-wave infrared anti-reflection protective film on the ZnS substrate described above was carried out with the transmittance test at room temperature and 400° C., respectively, and an average transmittance in the wavelength band of 7.0-9.5 μm was obtained.

The preparation parameters and test results of Examples 1-4 were shown in Table 1.

Comparative Example 1

<Preparation of the Long-Wave Infrared Anti-Reflection Protective Film on the ZnS Substrate>

Steps 1) to 2) were the same as in Example 1;

3) Except replacing the $Y_2O_3$ film layer with a $YbF_3$ film layer, the rest was the same as in Example 1;

4) The long-wave infrared anti-reflection protective film on the ZnS substrate was obtained when the temperature of the deposition chamber was decreased to room temperature.

<Experimental Test>

The prepared long-wave infrared anti-reflection protective film on the ZnS substrate described above was subjected to high and low temperature test, damp heat test, adhesion test, repeated friction test, and high temperature test. The test results showed that the film layer was cracked and peeled off and the like;

The prepared long-wave infrared anti-reflection protective film on the ZnS substrate described above was carried out with the transmittance test at room temperature, and an average transmittance in the wavelength band of 7.0-9.5 μm was obtained. The film was peeled off at 400° C., and the transmittance cannot be determined.

Comparative Example 2

Steps 1) to 2) were the same as in Example 1;

3) A $YbF_3$ film layer with a thickness of 1200 nm was deposited on the ZnS film layer obtained in step 2) by the evaporation coating method, oxygen was not passed through during the deposition process, the deposition evaporation beam current was 25 mA, the deposition evaporation rate was 0.4 nm/s, and the deposition voltage was 10 kV;

4) The long-wave infrared anti-reflection protective film on the ZnS substrate was obtained when the temperature of the deposition chamber was decreased to room temperature.

<Experimental Test>

The prepared long-wave infrared anti-reflection protective film on the ZnS substrate described above was subjected to high and low temperature test, damp heat test, adhesion test, repeated friction test, and high temperature test. The test results showed that the film layer was cracked and peeled off and the like;

The prepared long-wave infrared anti-reflection protective film on the ZnS substrate described above was carried out with the transmittance test at room temperature, and an average transmittance in the wavelength band of 7.0-9.5 μm was obtained. The film was peeled off at 400° C., and the transmittance cannot be determined.

The preparation parameters and test results of Comparative Examples 1-2 were shown in Table 1.

TABLE 1

Preparation parameters and test results for each of examples and comparative examples Longwave infrared antireflection protective film on the ZnS substrate

| | Substrate | | First film layer | | Second film layer | | | | | | Average transmittance in the wavelength band of 7.0-9.5 μm | |
|---|---|---|---|---|---|---|---|---|---|---|---|---|
| | Material type | Thickness (mm) | Material type | Thickness (nm) | Material type | Thickness (nm) | Oxygen-argon ratio at the beginning of deposition | Oxygen-argon ratio at the end of deposition | Change mode of oxygen-argon ratio | Adhesion (N/cm²) | R.M. | 400° C. |
| Ex. 1 | ZnS | 8 | ZnS | 100 | $Y_2O_3$ | 1200 | 3.4:35 | 0.8:35 | Linear | Good | 89.08% | 88.01% |
| Ex. 2 | ZnS | 8 | ZnS | 100 | $Y_2O_3$ | 1000 | 2.8:35 | 0.6:35 | Linear | Good | 88.76% | 88.16% |
| Ex. 3 | ZnS | 8 | ZnS | 100 | $Y_2O_3$ | 1300 | 3.1:35 | 1.0:35 | Linear | Good | 88.92% | 88.09% |
| Ex. 4 | ZnS | 8 | ZnS | 100 | $Y_2O_3$ | 1300 | 3.4:35 | 1.0:35 | Stepwise | Good | 90.05% | 89.75% |
| Com. Ex. 1 | ZnS | 8 | ZnS | 100 | $YbF_3$ | 1200 | Ar:35 | Ar:20 | No oxygen passed through | Peeled off at 400° C. | 90.2% | Unable to test the peeling |
| Com. Ex. 2 | ZnS | 8 | ZnS | 100 | $YbF_3$ | 1200 | Ar:35 | Ar:20 | No oxygen passed through | Peeled off at 400° C. | 90.32% | Unable to test the peeling |

It can be seen from Examples 1-4 and Comparative Examples 1-2 that the long-wave infrared anti-reflection protective film on the ZnS substrate provided by the present application has significantly higher adhesion than the long-wave infrared anti-reflection protective film on the ZnS substrate provided by Comparative Examples 1-2; moreover, its average transmittance in the wavelength band of 7.0-9.5 μm at 400° C. does not decrease compared to the average transmittance at room temperature.

The long-wave infrared anti-reflection protective film on the ZnS substrate provided by the present application enables to withstand high and low temperature tests, damp heat tests, adhesion tests, repeated friction tests and high temperature tests. After the above-mentioned tests, the film layer is intact, does not peel off, and has no apparent cracks and stripping, etc. It has the advantages of high hardness, good adhesion, good firmness, good friction resistance, etc., and the structure is stable.

In summary, the method for preparing the long-wave infrared anti-reflection protective film on the ZnS substrate of the present application can control the structure of the film layer by adjusting the oxygen:argon ratio and the evaporation rate of the coating material so as to form a long-wave infrared anti-reflection protective film on the ZnS substrate with good refractive index matching and stable structure. Its average transmittance in the wavelength band of 7.0-9.5 μm at a high temperature of 400° C. has a slight reduction compared to the average transmittance at room temperature, the optical performance is excellent, and the average transmittance is 88% or more, which enables to meet the requirements of the window film layer for high-speed aircraft.

The foregoing descriptions are only preferred examples of the present application, and are not intended to limit the scope of the present application. Any modification, equivalent replacement, improvement and the like made within the spirit and principle of the application are all included in the scope of the application.

The invention claimed is:

1. A long-wave infrared anti-reflection protective film on a ZnS substrate, comprising: a ZnS film layer and a $Y_2O_3$ film layer sequentially arranged on the ZnS substrate;
   wherein the ZnS substrate has a thickness of 2-15 mm;
   the ZnS film layer has a thickness of 80-120 nm, the $Y_2O_3$ film layer has a thickness of 1000-1300 nm, and a structure of the $Y_2O_3$ film layer gradually changes from an inside to a surface.

2. The long-wave infrared anti-reflection protective film on the ZnS substrate of claim 1, wherein a crystal structure of the $Y_2O_3$ film layer gradually changes from the inside to the surface.

3. The long-wave infrared anti-reflection protective film on the ZnS substrate of claim 1, wherein the $Y_2O_3$ film layer comprises 8-14 sublayers, and the crystal structure of the $Y_2O_3$ film layer gradually changes from a sublayer near the ZnS film layer to the surface of the $Y_2O_3$ film layer.

4. The long-wave infrared anti-reflection protective film on the ZnS substrate of claim 3, wherein each of the sublayers has a thickness of 90-130 nm.

5. The long-wave infrared anti-reflection protective film on the ZnS substrate of claim 1, wherein the protective film has an average transmittance of 88% or more in the wavelength band of 7.0-9.5 μm.

6. A method for preparing the long-wave infrared anti-reflection protective film on the ZnS substrate according to claim 1, comprising:
   1) performing a polishing treatment and a surface treatment on the ZnS substrate;
   2) depositing a ZnS film layer on the ZnS substrate;
   3) depositing a $Y_2O_3$ film layer on the ZnS film layer, wherein oxygen:argon ratio is (2.8-3.4):35 at the beginning of the depositing, the oxygen:argon ratio is gradually reduced during the depositing, and the oxygen:argon ratio is (0.6-1.0):35 at the end of the depositing;
   wherein the ZnS substrate has a thickness of 2-15 mm;
   wherein the ZnS film layer has a thickness of 80-120 nm, and the $Y_2O_3$ film layer has a thickness of 1000-1300 nm.

7. The method of claim 6, wherein in step 3), the oxygen:argon ratio decreases linearly from the beginning of the depositing to the end of the depositing when the $Y_2O_3$ film layer is deposited on the ZnS film layer.

8. The method of claim 6, wherein in step 3), the oxygen:argon ratio decreases stepwise at a rate of (0.1-0.3):35 for each additional sublayer when the $Y_2O_3$ film layer is deposited on the ZnS film layer;
   wherein each of the sublayers has a thickness of 90-130 nm.

9. The method of claim 6, wherein a current of electron beam evaporation deposition for the ZnS film layer is 15-25 mA, and a current of electron beam evaporation deposition for the $Y_2O_3$ film layer is 20-30 mA.

10. The method of claim 6, wherein an evaporation deposition rate for the ZnS film layer is 0.35-0.55 nm/s, and an evaporation deposition rate for the $Y_2O_3$ film layer is 0.3-0.5 nm/s.

11. The method of claim 6, wherein a deposition voltage for the ZnS film layer is 200-400 V, and a deposition voltage for the $Y_2O_3$ film layer is 8-10 kV.

* * * * *